(12) United States Patent
Yang et al.

(10) Patent No.: US 7,689,407 B2
(45) Date of Patent: Mar. 30, 2010

(54) METHOD OF LEARNING A SECOND LANGUAGE THROUGH THE GUIDANCE OF PICTURES

(75) Inventors: Kuo-Ping Yang, 4th Fl., No. 18-1, Section 3, Ren Ai Rd., Taipei (TW) 106; Chao-Jen Huang, Taipei (TW); Chien-Liang Chiang, Taipei (TW); Kun-Yi Hua, Taipei (TW); Chih-Long Chang, Taipei (TW); Ming-Hsiang Cheng, Taipei (TW); Yen-Jui Chiao, Taipei (TW)

(73) Assignee: Kuo-Ping Yang, Taipei (TW)

( * ) Notice: Subject to any disclaimer, the term of this patent is extended or adjusted under 35 U.S.C. 154(b) by 676 days.

(21) Appl. No.: 11/703,089

(22) Filed: Feb. 7, 2007

(65) Prior Publication Data

US 2008/0033712 A1   Feb. 7, 2008

(30) Foreign Application Priority Data

Aug. 4, 2006   (TW) .............................. 95128774 A

(51) Int. Cl.
G06F 17/28 (2006.01)
G09B 19/06 (2006.01)
G09G 5/00 (2006.01)

(52) U.S. Cl. .............................. 704/3; 704/2; 434/156; 434/157; 345/171

(58) Field of Classification Search ....................... None
See application file for complete search history.

(56) References Cited

U.S. PATENT DOCUMENTS

| | | | |
|---|---|---|---|
| 4,419,080 A * | 12/1983 | Erwin | 434/172 |
| 5,576,953 A * | 11/1996 | Hugentobler | 704/2 |
| 5,882,202 A * | 3/1999 | Sameth et al. | 434/157 |
| 6,022,222 A * | 2/2000 | Guinan | 434/169 |
| 6,305,942 B1 * | 10/2001 | Block et al. | 434/156 |
| 7,052,278 B2 * | 5/2006 | Johnson et al. | 434/156 |
| 7,150,630 B2 * | 12/2006 | Budra et al. | 434/169 |
| 7,174,287 B2 * | 2/2007 | Yamada | 704/2 |
| 7,194,403 B2 * | 3/2007 | Okura et al. | 704/7 |
| 7,401,016 B2 * | 7/2008 | Masuichi et al. | 704/10 |
| 7,563,099 B1 * | 7/2009 | Iftikhar | 434/167 |
| 2002/0059056 A1 * | 5/2002 | Appleby | 704/4 |

* cited by examiner

*Primary Examiner*—Matthew J Sked
(74) *Attorney, Agent, or Firm*—Bacon & Thomas, PLLC

(57) ABSTRACT

A method of learning a second language through the guidance of pictures that enables users to learn multiple languages through computers.

After users input a plurality of words, a picture/text interface will display the plurality of input words, a plurality of output words, and a plurality of pictures. The plurality of output words represent the plurality of input words in another language, and the plurality of pictures represent the plurality of input words.

20 Claims, 14 Drawing Sheets

81

| connection index 811 | Chinese 812 | English 813 |
|---|---|---|
| 001234 | 蘋果 | Apple |
| 001234p | 蘋果 | Apples |
| ... | ... | ... |
| 002345 | 我 | I |
| ... | ... | ... |
| 017890 | 吃 | eat |
| 017890b | 吃 | ate |
| 017890n | 吃 | eatting |
| 017890f | 吃 | will eat |
| ... | ... | ... |

FIG. 3

METHOD OF LEARNING A SECOND LANGUAGE THROUGH THE GUIDANCE OF PICTURES

BACKGROUND OF THE INVENTION

1. Field of the Invention

The present invention relates to a method of learning a second language through the guidance of pictures, more particularly, to a method of learning a second language under the guidance of pictures especially suitable for children.

2. Description of the Related Art

Statistically, most people tend to first notice pictures over text and have more lasting impressions of images. Consequently, typical language learning materials or software use a combination of pictures and text.

The language learning software currently in use has the following characteristics:

a. The language learning software displays a word in one language with a corresponding picture;

b. The corresponding picture is only shown for one word; if a user inputs a plurality of words, no corresponding picture is provided. Thus, the design of current language learning software utilizes the concept of a searching technique—after a user inputs one word, the corresponding picture for that word is displayed; after the user inputs next word, a picture corresponding to that word replaces the previous picture.

c. Some language learning software, which are used for translation purposes only, translate the text input by a user from a first language (such as Chinese) to a second language (such as English) and simultaneously display the texts of both languages on a screen without showing a corresponding picture at the same time.

d. After a user has input text in the first language and text in the second language has been displayed, the user cannot replace the text in the second language with text in another language, such as Spanish. Thus, this conventional design is inconvenient for people who learn multiple foreign languages.

It is therefore desirable to provide a method for learning a second language through the guidance of pictures that mitigates and/or obviates the aforementioned problems.

SUMMARY OF THE INVENTION

The main objective of the present invention is to provide a method of learning a second language through the guidance of pictures, which can facilitate children's learning processes in particular. The present invention is characterized by its picture displaying; in addition, texts of two different languages can be shown above or below a picture, strengthening users' text learning process of two languages through the assistance of pictures.

The present invention relates to a method of facilitating user to learn multiple languages through computers. In order to achieve the above-mentioned objective, the method of the present invention comprises:

providing a text input interface allowing users to input a plurality of input words;

providing an input language option interface capable of displaying a plurality of input languages from which users can choose one as an appointed input language of the input words aforementioned;

searching for pictures corresponding to the plurality of input words, wherein the plurality of pictures are used to express the input words;

providing an output language option interface capable of displaying a plurality of output languages from which users can choose one as an appointed output language of the output words aforementioned;

searching for output words corresponding to the plurality of input words, wherein the plurality of output words are used to express the plurality of input words; and providing a picture/text interface capable of displaying the plurality of input words, the plurality of output words, and the plurality of pictures, wherein the plurality of input words and the plurality of output words are placed below or above the pictures.

When the picture/text interface displays the plurality of input words, the plurality of output words, and the plurality of pictures, users can switch the language of the input words and the output words, enabling them to view the words in other languages.

Furthermore, the present invention can also play the audio data of the input words or the output words so as to facilitate the learning process.

Other objects, advantages, and novel features of the invention will become more apparent from the following detailed description when taken in conjunction with the accompanying drawings.

BRIEF DESCRIPTION OF THE DRAWINGS

FIG. 3 is an embodiment of a word database of the present invention.

DETAILED DESCRIPTION OF THE PREFERRED EMBODIMENT

Figure 1:
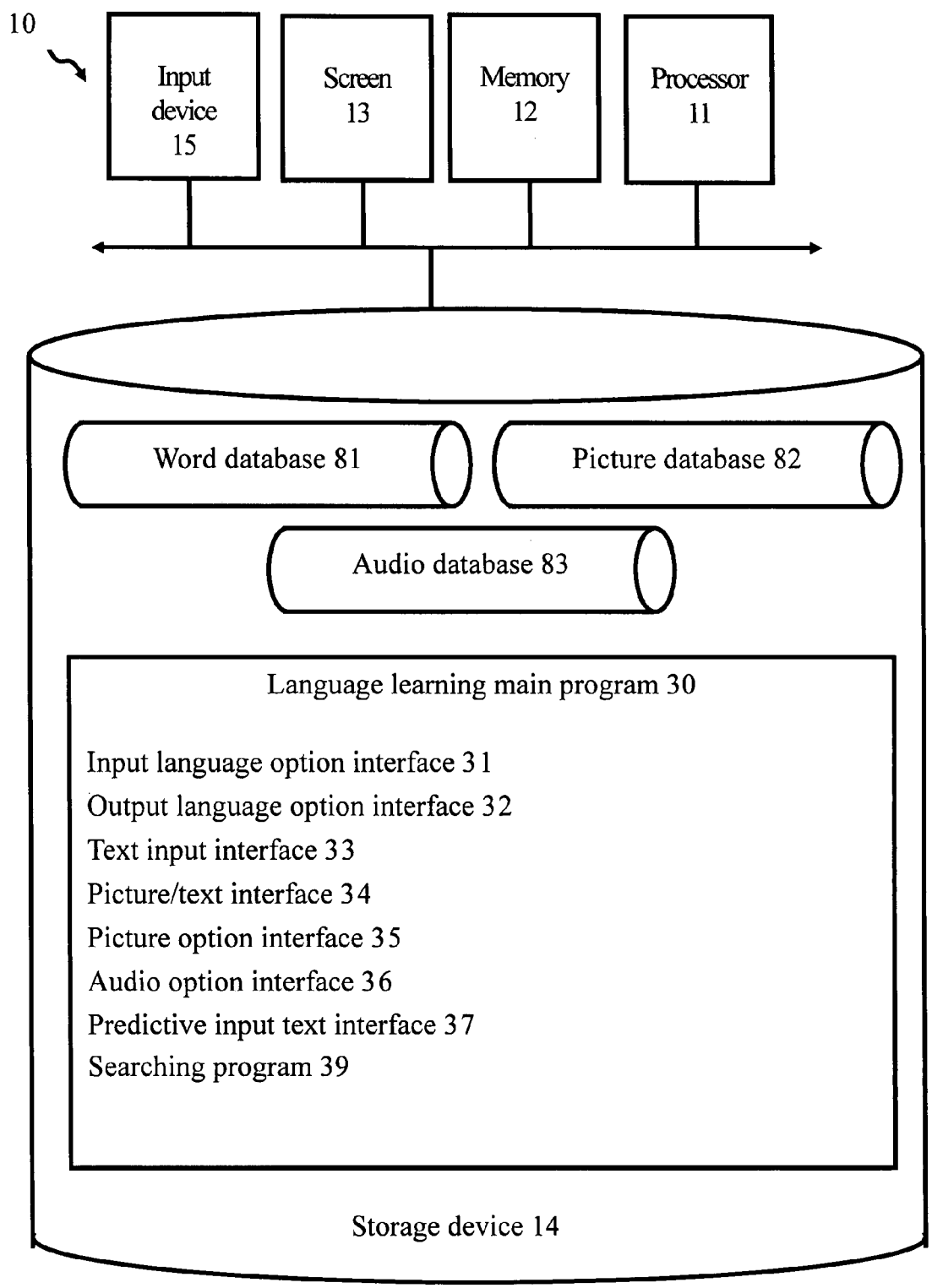
FIG. 1 is a hardware architecture diagram of the present invention.

Please refer to FIG. 1, which is a hardware architecture diagram of the present invention. A second language learning system 10 comprises a processor 11, a memory 12, a screen 13, a storage device 14 and an input device 15 (such as a keyboard or a mouse). The second language learning system 10 may therefore be used in a typical personal computer or a PDA (personal digital assistant).

In the present invention, the storage device 14 comprises a language learning main program 30, a word database 81, a picture database 82, and an audio database 83. The language learning main program 30 comprises an input language option interface 31, an output language option interface 32, a text input interface 33, a picture/text interface 34, a picture option interface 35, an audio option interface 36, a predictive input text interface 37, and a searching program 39. The above-mentioned programs and databases will be explained with the following flowchart.

Figure 2:
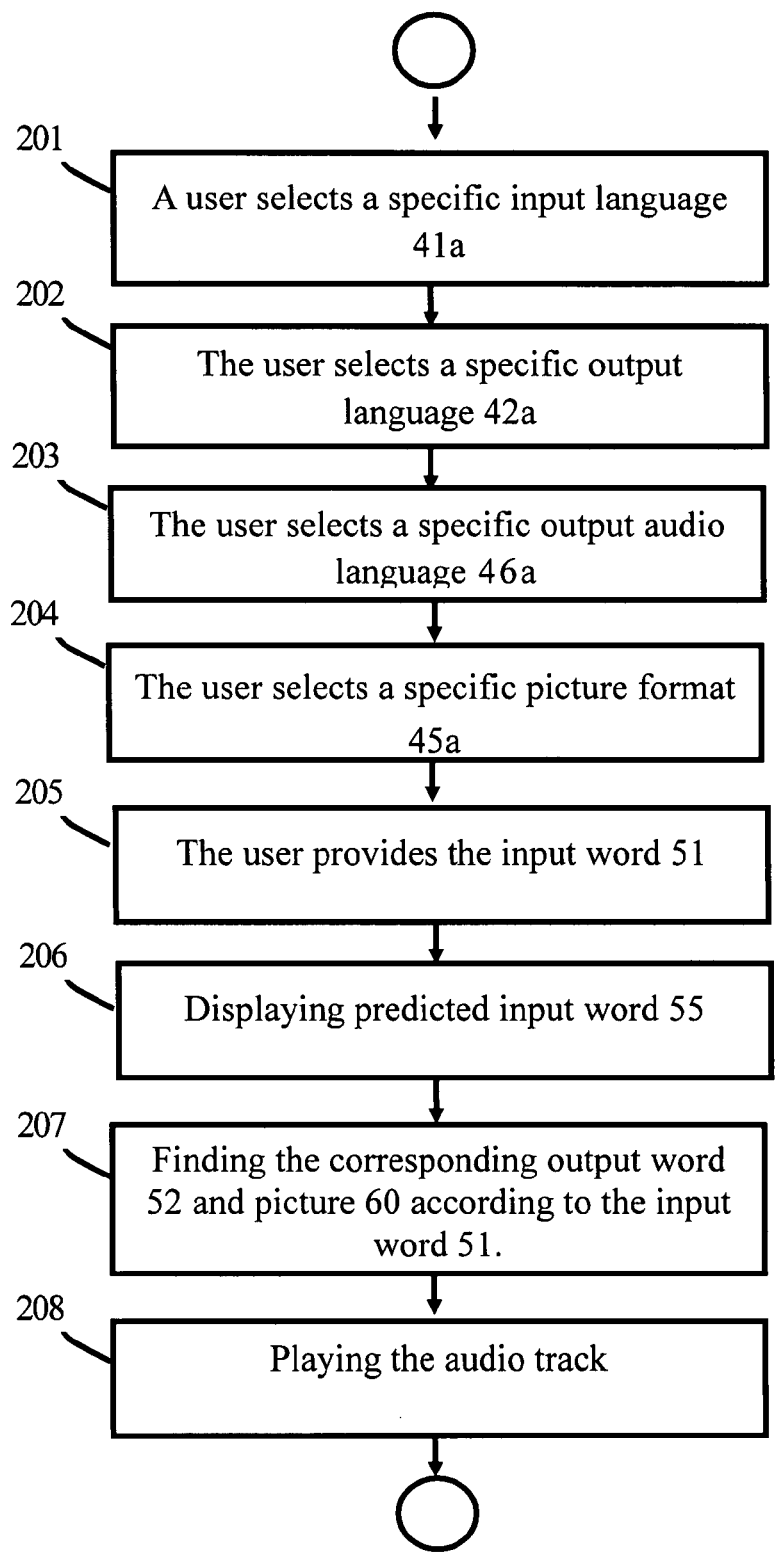
FIG. 2 is a flowchart of an embodiment of the present invention.

Please refer to FIG. 2. FIG. 2 is a flowchart of an embodiment of the present invention. Please also refer to FIG. 3~FIG. 14.

Step 201:

A user selects a specific input language 41a.

Figure 6:
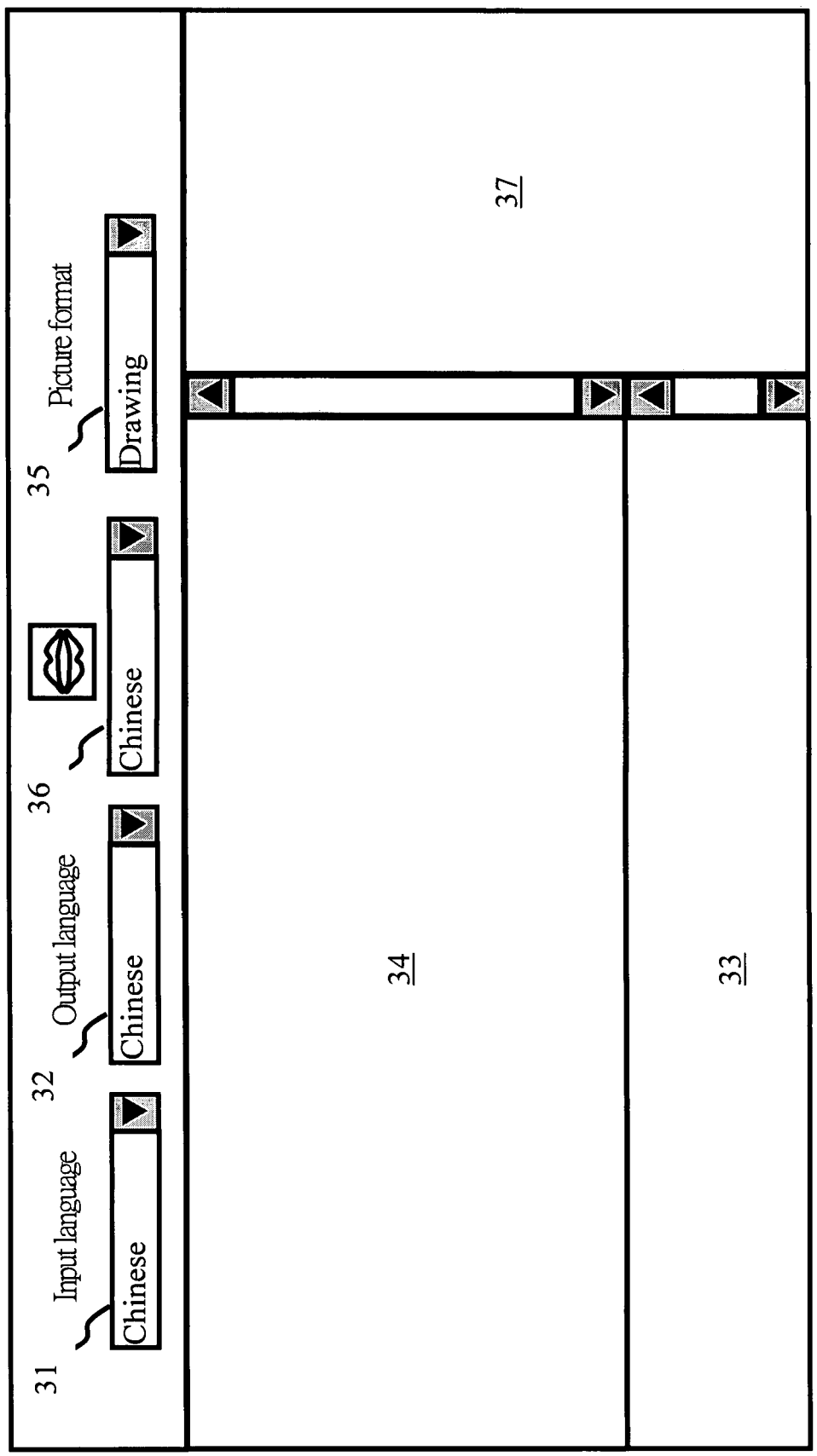
FIG. 6~FIG. 8 show embodiments according to the flowchart shown in FIG. 2.
Figure 7:
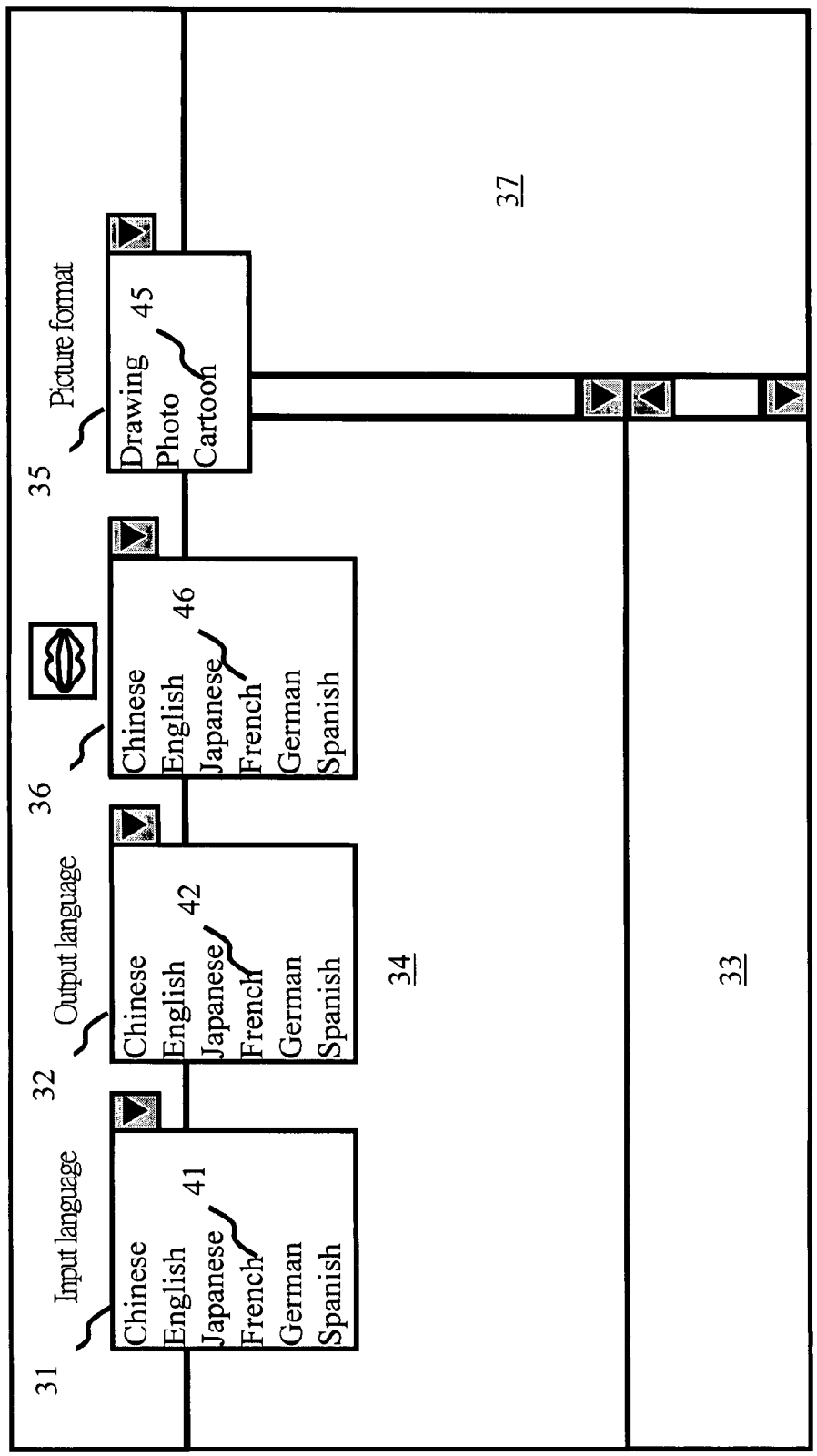
Figure 8:
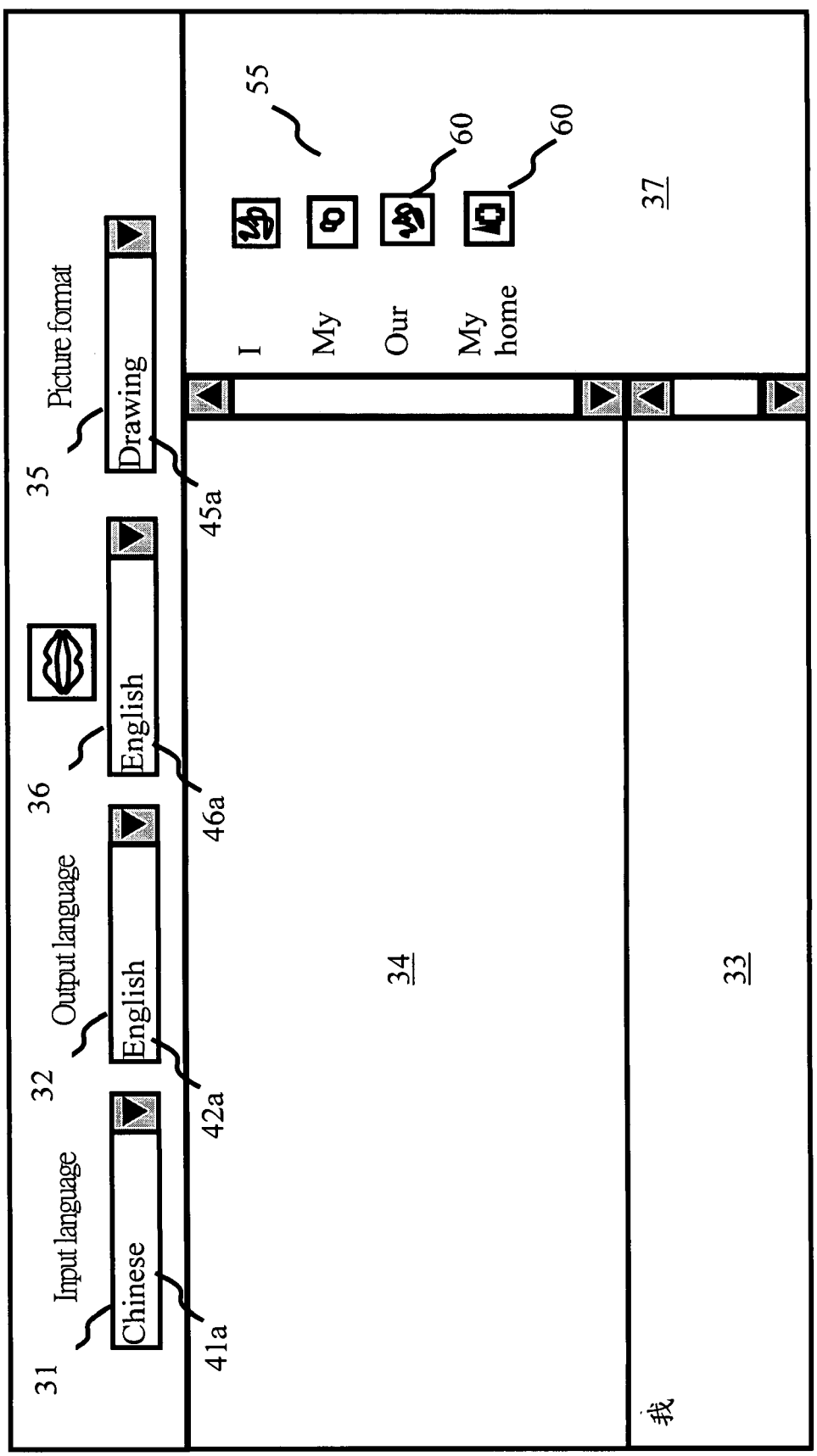

Please refer to FIG. 6~FIG 8. FIG. 6 shows the initial condition of all interfaces. The interfaces include: the input language option interface 31, the output language option interface 32, the text input interface 33, the picture/text interface 34, the picture option interface 35, the audio option interface 36, and the predictive input texts interface 37.

The user clicks on the language option interface 31, and the input language option interface 31 displays a plurality of input languages 41, such as Chinese, English, Japanese, French, German, and Spanish. The user selects a specific input language that he/she prefers from the plurality of input languages 41; as shown in FIG. 8, "Chinese" is chosen by the user as the specific input language 41a.

Step 202:

The user selects a specific output language 42a.

Please refer to FIG. 7 and FIG. 8. The user clicks on the output language option interface 32, and the output language option interface 32 displays a plurality of output languages 42, such as Chinese, English, Japanese, French, German, and Spanish. The user selects a specific output language that he/she prefers from the plurality of output languages 42; as shown in FIG. 8, "English" is chosen by the user as the specific output language 42a.

Step 203:

The user selects a specific output audio language 46a.

Please refer to FIG. 7 and FIG. 8. The user clicks on the audio option interface 36, and the audio option interface 36 displays a plurality of audio languages 46, such as Chinese, English, Japanese French, German, and Spanish. The user selects a specific output audio language 46a that he/she prefers from the plurality of audio languages 46; as shown in FIG. 8, "English" is chosen by the user as the specific output audio language 46a.

Moreover, since the specific output audio language 46a may be identical to the specific output language 42a, the audio option interface 36 is not a necessary component.

Step 204:

The user selects a specific picture format 45a.

Please refer to FIG. 7 and FIG. 8. The user clicks on the picture option interface 35, and the picture option interface 35 displays a plurality of picture formats 45, such as "drawing" and "photo." The user selects a specific picture format that he/she prefers from the plurality of pictures format 45; as shown in FIG. 8, "drawing" is chosen by the user as the specific picture format 45a.

However, if there is only one picture format, the picture option interface 35 is not a necessary component.

The above-mentioned steps 201~204 are all configuration steps; if the input language option interface 31, the output language option interface 32, the picture option interface 35, and the audio option interface 36 have displayed the correct specific language or picture format, the user can start from step 205.

Step 205:

The user provides the input word 51.

Figure 9:
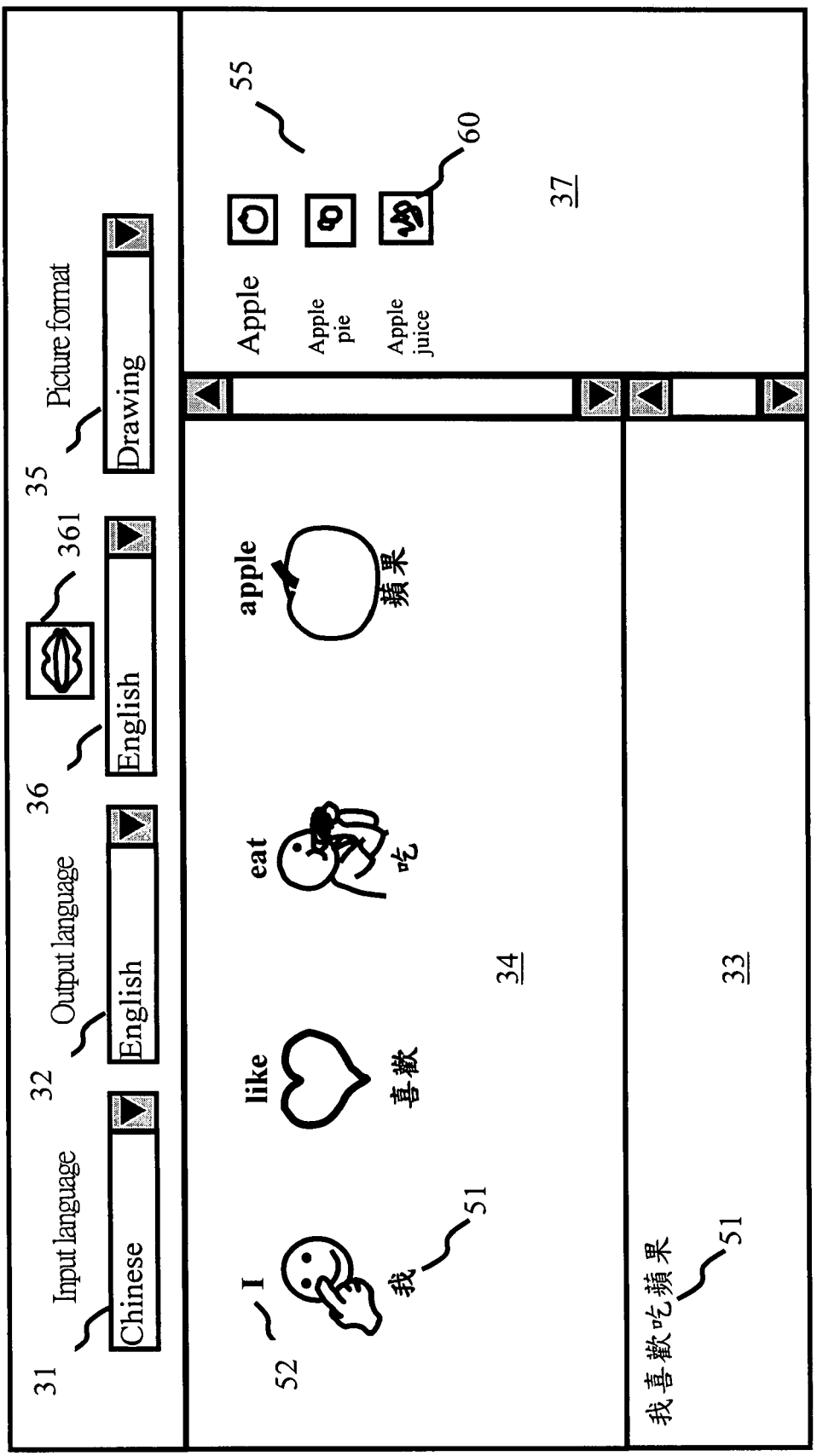
FIG. 9 shows a first embodiment of a picture/text interface.

Please refer to FIG. 9, the user may input a plurality of input words 51, such as "I like to eat apples", at the text input interface 33, wherein the input words 51 are entered in the specific input language 41a.

Step 206:

Displaying predicted input word 55.

In order to facilitate the user's inputting, a predictive text input interface 37 provides predicted input words. If the user inputs "apple", the predictive text input interface 37 lists predicted input words 55 (such as apple, apple pie, apple juice) and the corresponding pictures 60 of the predicted input words 55.

Step 207:

Finding the corresponding output word 52 and picture 60 according to the input words 51.

In this embodiment, the picture/text interface 34 displays a plurality of input words 51 (for example: "我喜歡吃蘋果"), the corresponding pictures 60, and a plurality of output words 52 (for example: "I like eat apple"). The plurality of output words 52 are in the specific output language 42a, and the plurality of output words 52 are used to express the plurality of input words 51.

Figure 10A:
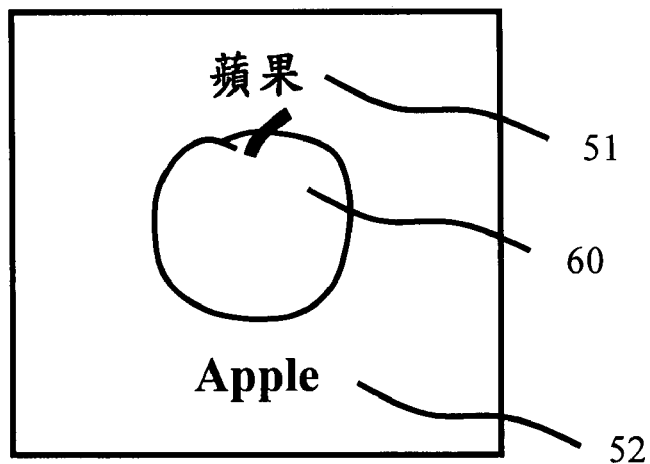
FIG. 10A, FIG. 10B, and FIG. 10C show different arrangements of input words and output words displayed at different positions in a picture.
Figure 10B:
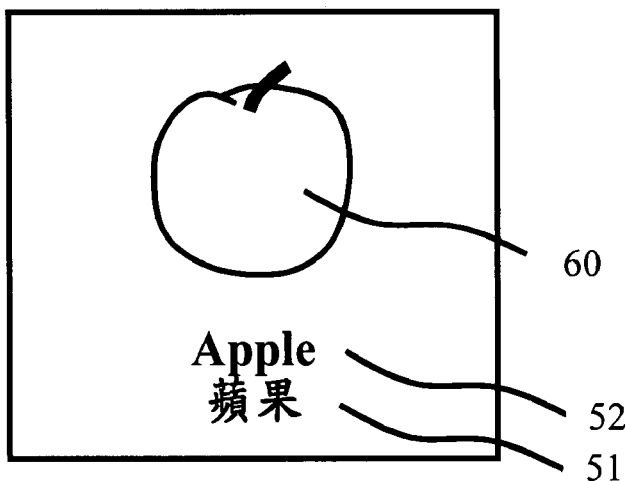
Figure 10C:
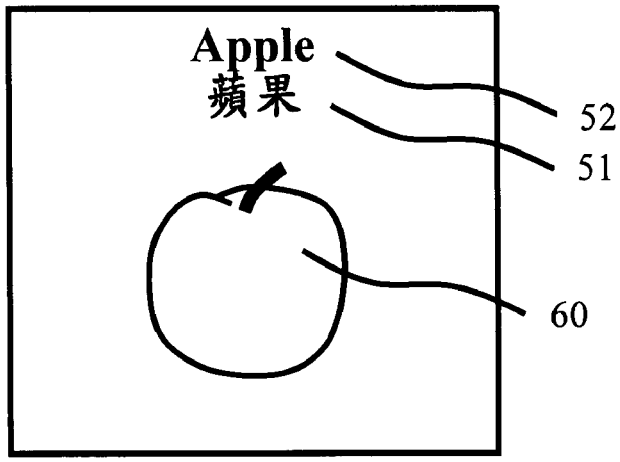

In addition, the present invention does not focus on providing correct translation, but on simultaneously showing the input words 51, the corresponding output words 52, and the pictures 60. In this embodiment, the input words 51 are below the pictures 60, and the output words 52 are above the pictures 60; however, other arrangements are possible as well. As shown in FIG. 10A, the input words 51 may be located above the pictures 60, and the output words 52 may be located below the pictures 60. As shown in FIG. 10B, the input words 51 and the output words 52 may both be located below the pictures 60; finally, as shown in FIG. 10C, the input words 51 and the output words 52 may both be located above the pictures 60.

The searching program 39 is used to find the output words 52 and pictures 60 corresponding to the input words 51. Please refer to FIG. 3~FIG. 5 for the word database 81, the picture database 82 and the audio database 83.

The word database 81 includes words of more than one language, such as Chinese and English used in this embodiment. The word database 81 comprises a connection index row 811, a Chinese row 812 and an English row 813. Words having a same meaning but in different languages are connected by the connection index row 811; for example, "蘋果"and "Apple" are words having a same meaning but in different languages; "蘋果"and "Apple" are thus both connected to a same connection index: "001234". Moreover, the "word" used in this document can be a vocabulary (such as "狗", "dog"), a phrase (such as "酒瓶", "wine bottle"), or a simple sentence (such as "你好嗎?", "How are you?").

Words in different languages may have more than one connection; for example, the connection index "001234" may correspond to "Apple", and the connection index "001234p" may correspond to "Apples"; however, in Chinese, there are no plural nouns or past tenses, future tenses, or present continuous tenses.

Figure 4:
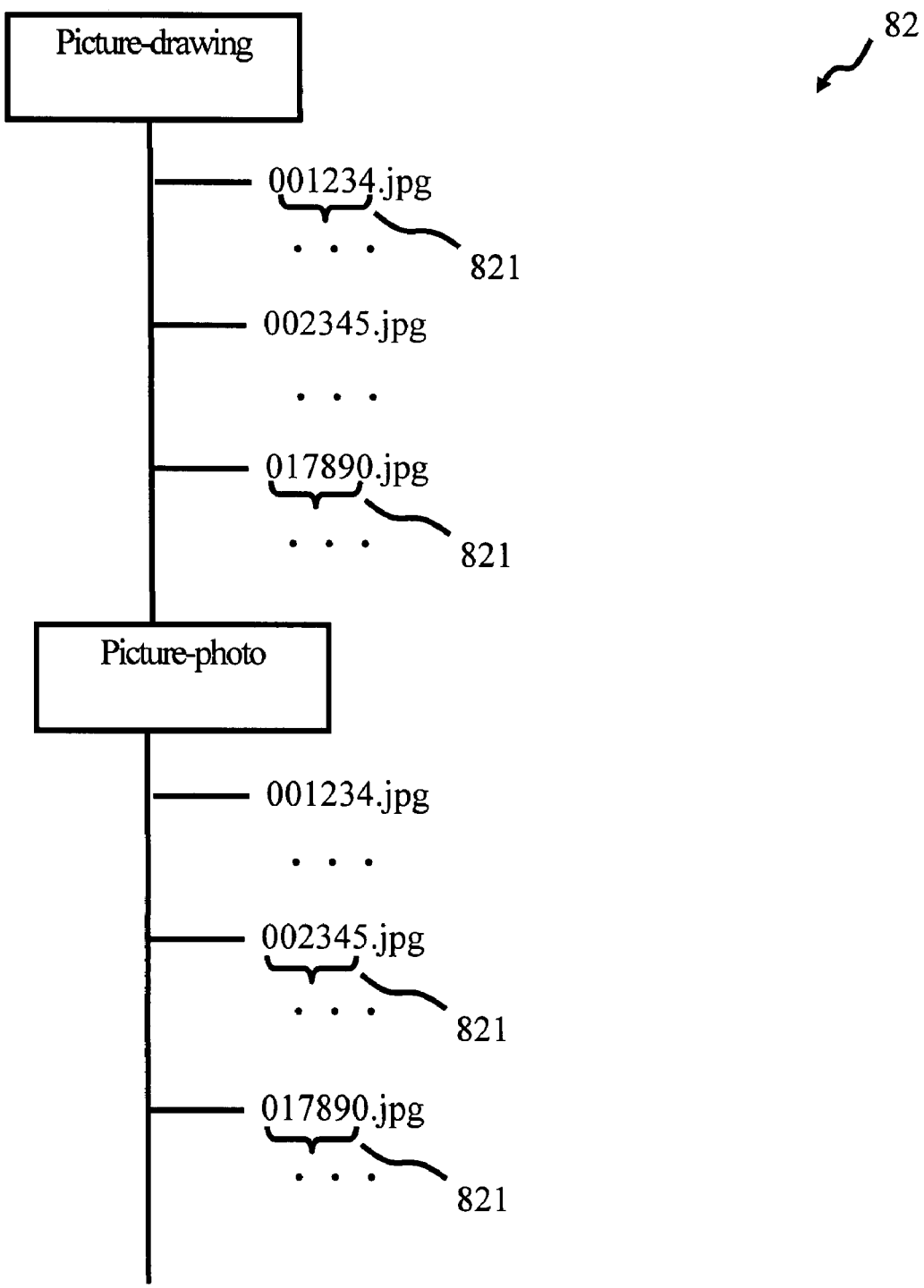
FIG. 4 is an embodiment of a picture database of the present invention.

Please refer to FIG. 4. FIG. 4 is an embodiment of a picture database 82 of the present invention. The picture database 82 comprises a plurality of pictures; in this embodiment the plurality of pictures are stored in the storage device 14 as a plurality of picture files (such as jpg files), and picture filenames 821 of the picture files may be identical to the corresponding connection index; for example, the picture filename 821 of the file "001234.jpg" is "001234", and the file "001234.jpg" is the corresponding picture of "蘋果"and "Apple". Thus, the corresponding "picture" of a "word" can be found.

In this embodiment, there are two picture formats: "drawing" and "photo". Pictures belong to the "drawing format" are stored in a "picture-drawing" folder, and pictures belong to the "photo format" are stored in a "picture-photo" folder. The file named "001234.jpg" in the "picture-drawing" folder may be in "drawing format", and the file named "001234.jpg" in the "picture-photo" folder may be in "photo format". The picture filename 821 may be different from the connection index of the corresponding word; for example, the corresponding picture file "001234.jpg" of "Apple" may also be named "picture-001234.jpg". Since "picture-001234.jpg" still has the connection index "001234", it can be found through the connection index "001234". Of course, the corresponding picture file "001234.jpg" of "Apple" may also be named "apple.jpg" or even irrelevantly "abcd.jpg", as long as a relation table (not shown, which is a relation table of "word" and "picture filename") is established in the database.

Preferably, each word has its corresponding picture; however, since some words are abstract in nature (such as "really?", "nanometer"), they may have no corresponding picture.

Figure 5:
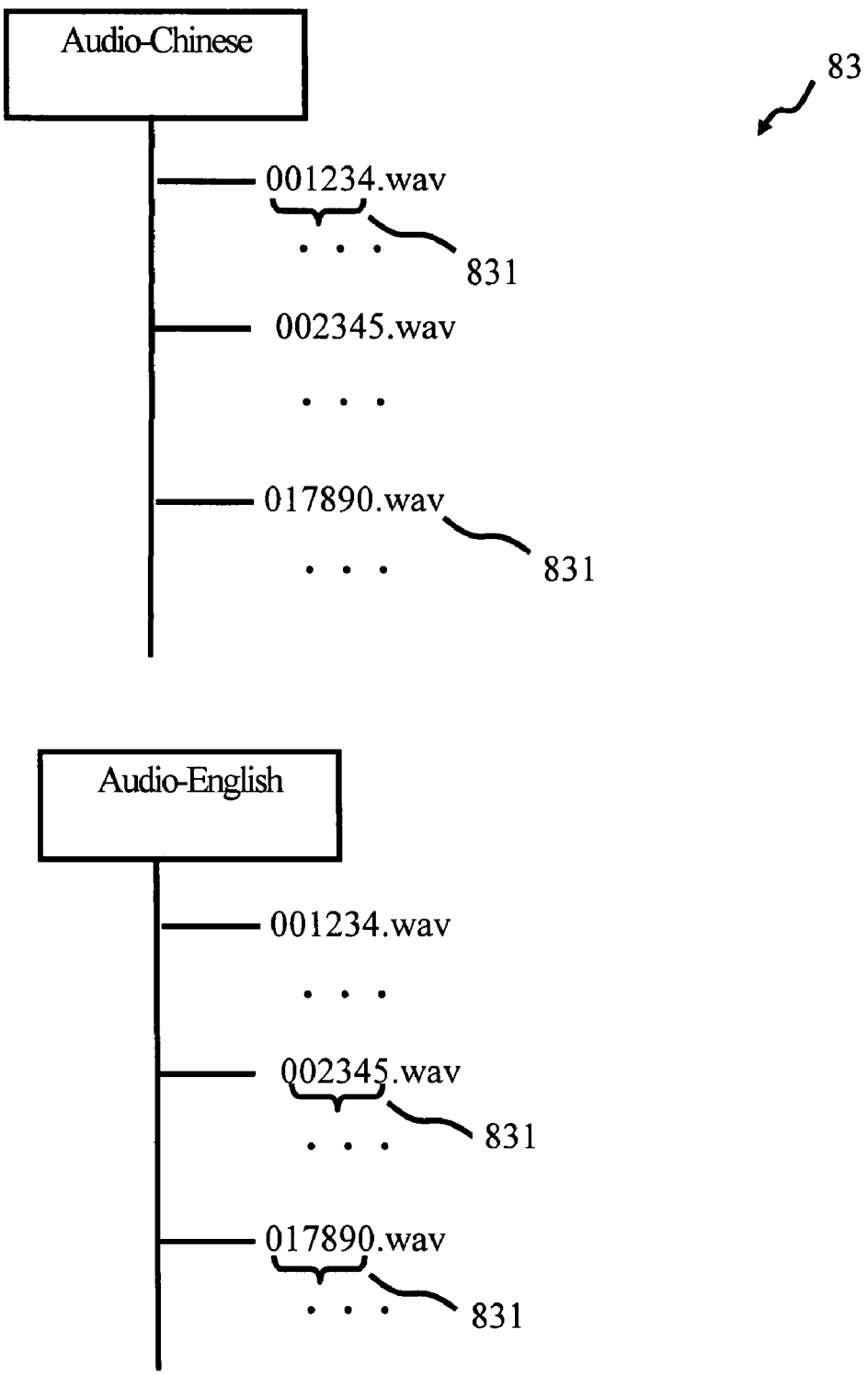
FIG. 5 is an embodiment of an audio database of the present invention.

Please refer to FIG. 5. FIG. 5 is an embodiment of an audio database 83 of the present invention. The audio database 83 comprises a plurality of audio tracks and has a structure similar to that of the picture database 82. The filename of the audio track 831 is related to the "connection index" of the corresponding word; for example, the Chinese pronunciation of "蘋果"is stored in a file "001234.wav" in an "audio-Chinese" folder, and the English pronunciation of "Apple" is stored in a file "001234.wav" in an "audio-English" folder. If the learning system 10 provides ten different languages, there may be ten folders. Each language may provide more than one kind of pronunciation; for example, if the Chinese includes two kinds of pronunciation "male voice" and "female voice", there may be a "male voice audio-Chinese" folder and a "female voice audio-Chinese" folder.

The searching program 39 performs the searches according to the connection relationships between the text, pictures, and audio tracks, and the main point here is the "connection index".

Preferably, each word has its corresponding audio track; however, since some words do not exist in other languages, or one word may be connected to two audio tracks (feminine and masculine), the words and the audio data do not necessarily have a one-to-one correspondence with each other.

Step 208:

Playing the audio track.

The user presses a "speak" button 361 to play the audio track, which is the specific output audio data 46a. Please refer again to step 203.

Figure 11A:
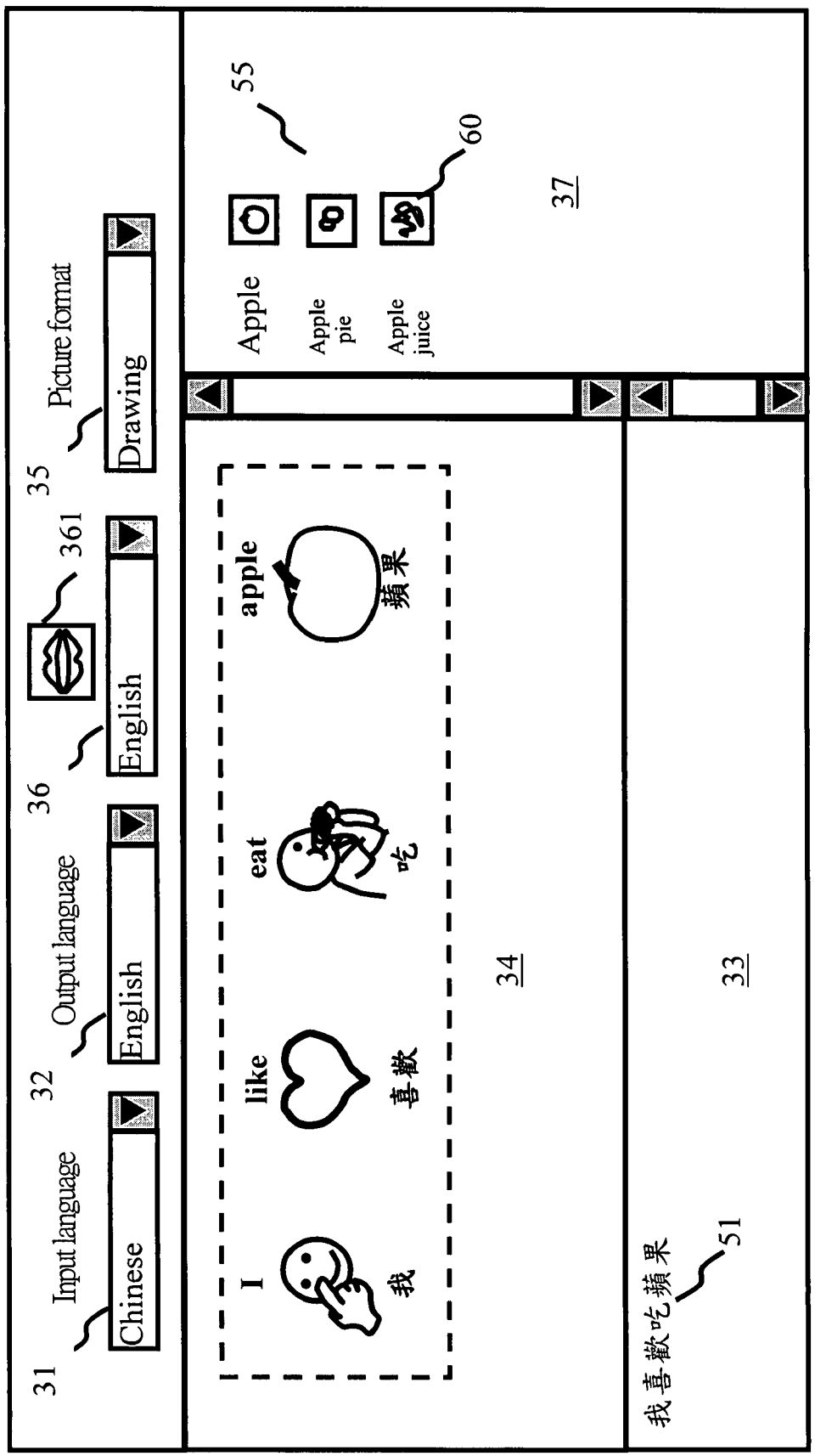
FIG. 11A and FIG. 11B show embodiments changing words and output words at the picture/text interface.
Figure 11B:
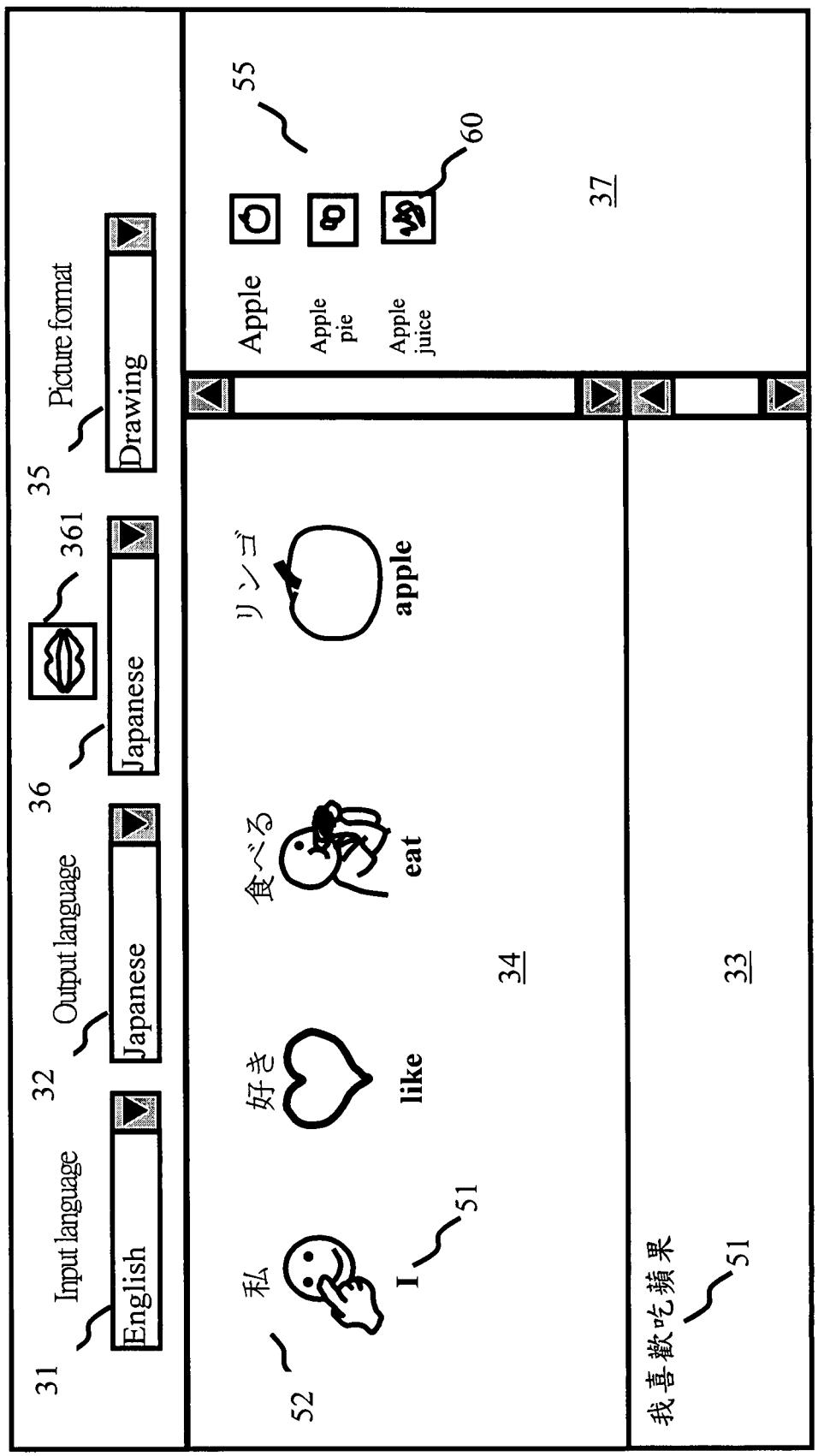

Please refer to FIG. 11A. In the process of inputting the input words 51 or after the process of inputting input words 51, the user can change the specific input language 41a or the specific output language 42a whenever he/she wants through the input language option interface 31 and the output language option interface 32. For example, in FIG. 9, the interfaces originally show "English" and "Chinese"; the user can use the mouse to select (block) the portion he/she wants to change (as shown by the dashed line) and change the specific input language 41a to "English" and the specific output language 42a to "Japanese", as shown in FIG. 11B.

Figure 12:
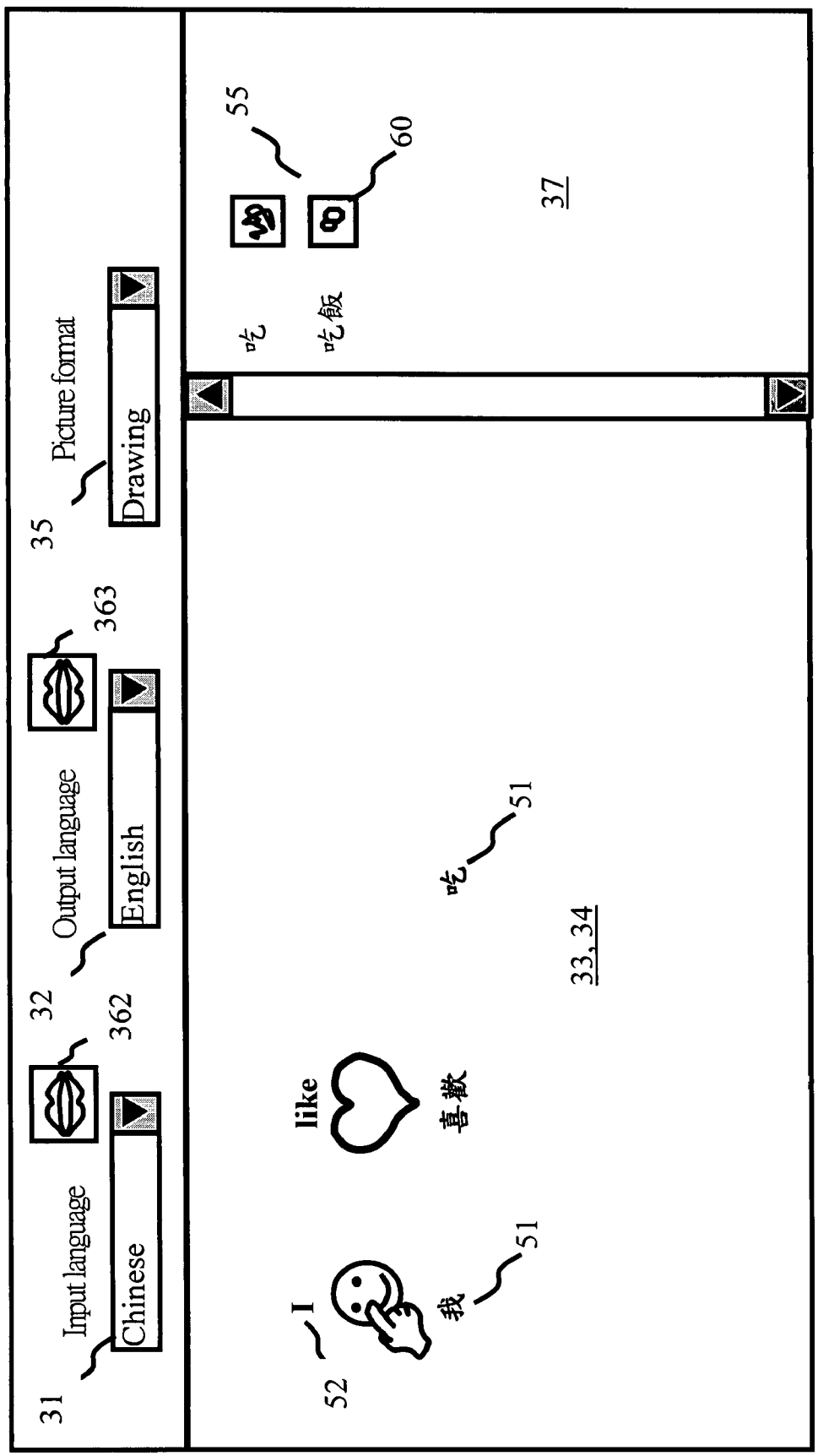
FIG. 12 shows a second embodiment of the text input interface and the picture/text interface.

FIG. 12 shows another embodiment of the text input interface and the picture/text interface. In FIG. 12, in comparison with FIG. 7~9, the text input interface 33 is merged with the picture/text interface 34; therefore, when the user inputs the input word 51, the input word 51 is displayed on the picture/text interface 34. For example, as shown in FIG. 12, the user has inputted "我"and "喜歡"and is inputting "吃", and the picture for "吃"has not yet shown. In FIG. 12, there is no audio option interface 36; when the user presses the "speak" button 362, the audio data of the specific input language 41a is pronounced; when the user presses the "speak" button 363, the audio data of the specific output language 42a is pronounced.

Some languages may have different word conjugations, and the present invention may add marks on displayed pictures 60.

Figure 13:
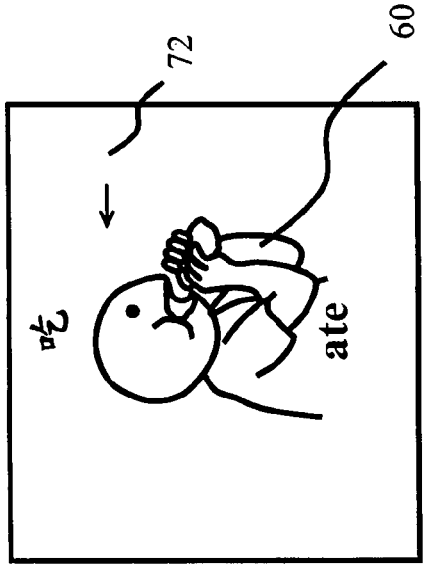
FIG. 13 shows an embodiment having a picture with a plurality mark.

Please refer to FIG. 13. If the user inputs "apples", the picture 60 may additionally include a plurality mark 71.

Figure 14:
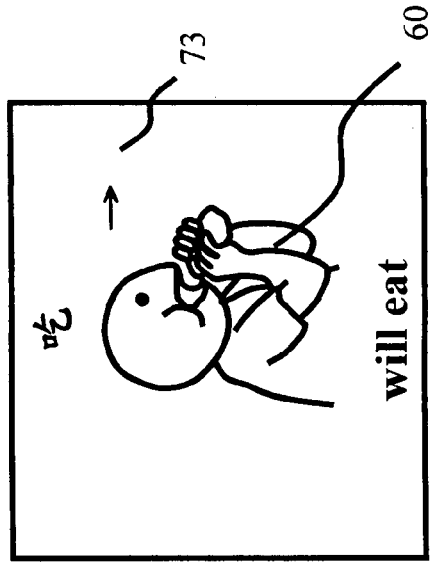
FIG. 14 shows an embodiment having a picture with a past tense mark.

Please refer to FIG. 14. If the user inputs "ate", the past tense of "eat", the picture 60 may further include a past tense mark 72.

Figure 15:
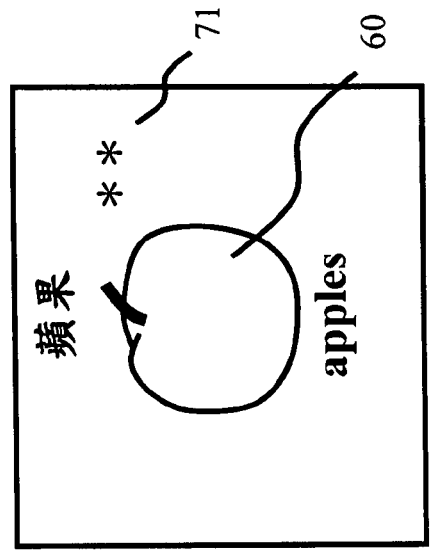
FIG. 15 shows an embodiment having a picture with a present continuous tense mark.

Please refer to FIG. 15. If the user inputs "eating", the present continuous tense of "eat", the picture 60 may include a present continuous tense mark 74.

Figure 16:
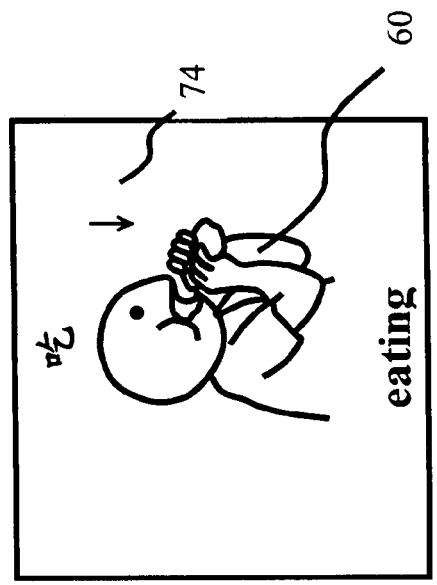
FIG. 16 shows an embodiment having a picture with future tense marks.

Please refer to FIG. 16. If the user inputs "will eat", the future tense of "eat", the picture 60 may include a future tense mark 73.

The word database 81 can be used to store the information of the marks (please refer to FIG. 3). If, for example, the connection index 811 of "Apple" is "001234", and the connection index 811 of "Apples" is "001234p", even through "apple" and "apples" share the same picture, the language learning program 30 can add the plurality mark 71 based upon the extra "p" due to that the connection index "001234p" has one more "p" than the connection index "001234". In the same manner, the past tense mark 72, the future tense mark 73 and the present continuous tense mark 74 can be provided as well.

Although the present invention has been explained in relation to its preferred embodiment, it is to be understood that many other possible modifications and variations can be made without departing from the spirit and scope of the invention as hereinafter claimed.

What is claimed is:

1. A method of learning a second language through the guidance of pictures that enables users to learn multiple languages through computers, comprising:
    providing a text input interface allowing users to input a plurality of input words;
    searching for a plurality of pictures corresponding to the plurality of input words, wherein the plurality of pictures are used to express the plurality of input words;
    searching for a plurality of output words corresponding to the plurality of input words, wherein the plurality of output words are used to express the plurality of input words; and
    providing a picture/text interface capable of displaying:
        a plurality of input words,
        a plurality of output words, and
        a plurality of pictures.

2. The method as claimed in claim 1, further comprising:
    providing an input language option interface capable of displaying a plurality of input languages from which users can choose one as an appointed input language of the input words; and providing an output language option interface capable of displaying a plurality of output languages from which users can choose one as an appointed output language of the output words.

3. The method as claimed in claim 2, wherein the plurality of input words are placed below or above the plurality of pictures, and the plurality of output words are placed below or above the plurality of pictures.

4. The method as claimed in claim 3, wherein users can change the specific output language by operating the output language option interface so as to changed the language of the plurality of output words displayed on the picture/text interface.

5. The method as claimed in claim 3, further comprising: providing a picture option interface capable of displaying plurality of picture formats from which users can choose a specific picture format.

6. The method as claimed in claim 3, further comprising: providing a predictive input text interface for displaying predicted input words when users input the plurality of input words.

7. The method as claimed in claim 3, wherein when the pictures include a picture presenting a plural noun, the picture presenting a plural noun further comprises a plurality mark indicating the concept of the plural noun.

8. The method as claimed in claim 3, wherein:
if the plurality of pictures include a picture presenting a past tense verb, the picture presenting the past tense verb further comprises a past tense mark indicating the concept of the past tense verb;
if the plurality of pictures include a picture presenting a future tense verb, the picture presenting the future tense verb further comprises a future tense mark indicating the concept of the future tense verb; and
if the plurality of pictures include a picture presenting a present continuous tense verb, the picture presenting the present continuous tense verb further comprises a present continuous tense mark indicating the present continuous tense verb concept.

9. The method as claimed in claim 2, wherein users can change the specific output language by operating the output language option interface so as to changed the language of the plurality of output words displayed on the picture/text interface.

10. The method as claimed in claim 1, wherein the plurality of input words are placed below or above the plurality of pictures, and the plurality of output words are placed below or above the of plurality of pictures.

11. A computer product having a computer readable medium that contains a program to enable users to learn multiple languages through a computer, the computer readable medium comprising:
a first code: providing a text input interface allowing a users to input a plurality of input words;
a second code: searching for a plurality of pictures corresponding to the plurality of input words, wherein the plurality of pictures are used to express the plurality of input words;
a third code: searching for a plurality of output words corresponding to the plurality of input words, wherein the plurality of output words are used to express the plurality of input words; and
a fourth code: providing a picture/text text displaying:
the plurality of input words;
the plurality of output words; and
the plurality of pictures.

12. The computer product as claimed in claim 11, wherein said computer readable medium further comprising:
a fifth code: providing an input language option interface capable of displaying a plurality of input languages from which users can choose one as an appointed input language of the input words; and
a sixth code: providing an output language option interface capable of displaying a plurality of output languages from which users can choose one as an appointed output language of the output words.

13. The computer product as claimed in claim 12, wherein the plurality of input words are placed below or above the plurality of pictures, and the plurality of output words are placed below or above the plurality of pictures.

14. The computer product as claimed in claim 13, wherein users can change the specific output language by operating the output language option interface so as to changed the language of the plurality of output words displayed on the picture/text interface.

15. The computer product as claimed in claim 13, wherein said computer readable medium further comprising a seventh code: providing a picture option interface capable of displaying plurality of picture formats from which users can choose a specific picture format.

16. The computer readable article as claimed in claim 13, wherein said computer readable medium further comprising a eighth code: providing a predictive input text interface for displaying predicted input words when users input the plurality of input words.

17. The computer readable article as claimed in claim 13, wherein when the pictures include a picture presenting a plural noun, the picture presenting a plural noun further comprises a plurality mark indicating the concept of the plural noun.

18. The computer readable article as claimed in claim 13, wherein:
if the plurality of pictures include a picture presenting a past tense verb, the picture presenting the past tense verb further comprises a past tense mark indicating the concept of the past tense verb;
if the plurality of pictures include a picture presenting a future tense verb, the picture presenting the future tense verb further comprises a future tense mark indicating the concept of the future tense verb; and
if the plurality of pictures include a picture presenting a present continuous tense verb, the picture presenting the present continuous tense verb further comprises a present continuous tense mark indicating the present continuous tense verb concept.

19. The computer product as claimed in claim 12, wherein users can change the specific output language by operating the output language option interface so as to changed the language of the plurality of output words displayed on the picture/text interface.

20. The computer product as claimed in claim 11, wherein the plurality of input words are placed below or above the plurality of pictures, and the plurality of output words are placed below or above the of plurality of pictures.

* * * * *